US 6,967,730 B2

(12) United States Patent
Tomita

(10) Patent No.: US 6,967,730 B2
(45) Date of Patent: Nov. 22, 2005

(54) INFORMATION PROCESSING APPARATUS, INFORMATION PROCESSING METHOD, COMPUTER READABLE PROGRAM, AND STORAGE MEDIUM PRODUCT STORING COMPUTER READABLE PROGRAM

(75) Inventor: Makoto Tomita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 955 days.

(21) Appl. No.: 09/908,698

(22) Filed: Jul. 20, 2001

(65) Prior Publication Data

US 2002/0054312 A1 May 9, 2002

(30) Foreign Application Priority Data

Jul. 28, 2000 (JP) .............................. 2000-228866

(51) Int. Cl.⁷ ............................ G06F 15/00; G06F 9/46
(52) U.S. Cl. .................... 358/1.13; 358/1.13; 718/102
(58) Field of Search .............................. 358/1.13, 1.15, 358/1.14; 718/102

(56) References Cited

U.S. PATENT DOCUMENTS 5,471,564 A * 11/1995 Dennis et al. ............. 358/1.15
6,665,081 B1 * 12/2003 Suzuki et al. ............. 358/1.13

FOREIGN PATENT DOCUMENTS

JP          11-129583        5/1999

* cited by examiner

Primary Examiner—Kimberly Williams
Assistant Examiner—Saeid Ebrahimi-Dehkordy
(74) Attorney, Agent, or Firm—Fitzpatrick, Cella, Harper & Scinto

(57) ABSTRACT

When users employ a printer driver having the function of automatically selecting a development mode, the invention is intended to make the function of automatically selecting a development mode more convenient to the users. To that end, when one of development modes including a vector mode and an image mode is automatically decided, the printer driver automatically decides a plurality of print setting items in printing data to be processed in the decided development mode depending on the contents of drawing.

6 Claims, 15 Drawing Sheets

OPERATION OF DRIVER IN CONFIGURATION OF FIG. 2

OPERATION OF DRIVER IN CONFIGURATION OF FIG. 3

NEW GENERATION SUPER-TELEPHOTO L LENS EQUIPPED WITH HAND SHAKE CORRECTING MECHANISH AND REALIZING MAX LEVEL OF IMAGE QUALITY

1. SUPER-HIGH IMAGE QUALITY BASED ON NOVEL OPTICAL DESIGN

600dpi
8bit FOR EACH OF RGB IMAGE DATA

2. EQUIPPED WITH HAND SHAKE CORRECTING MECHANISM

HAND SHAKE CORRECTING MECHANISM HAS FEATURE GIVEN BELOW

HAND SHAKE CORRECTING MODE 2

FIG. 8

| AUTO | CPDL | Raster |
|---|---|---|
| | | ModeDetails |
| Gradati | Gradati | Gradati |
| ColorHalftones | ColorHalftones | ColorHalftones |
| GrayCompensation | GrayCompensation | GrayCompensation |
| ⋮ | ⋮ | ⋮ |
| ⋮ | ⋮ | ⋮ |
| ⋮ | ⋮ | ⋮ |
| | | |
| | | |
| | | |
| | | |
| | | |
| | | |

FIG. 10

COLLECTION OF DISCRIMINATION INFORMATION

| | | |
|---|---|---|
| PRINTING DATE | | |
| PRINTING OPERATOR | | |
| FILE NAME | | |
| FILE CREATION DATE | | |
| FILE UPDATING DATE | | |
| APPLICATION NAME | | |
| APPLICATION VERSION | | |
| DRIVER OPERATING STATUS | | |
| TOTAL NUMBER OF PAGES | | |
| 1ST PAGE | TEXT | NUMBER OF OBJECTS |
| | | MAX POINT SIZE |
| | GRAPHICS | NUMBER OF OBJECTS |
| | | ROP |
| | IMAGE | RESOLUTION, GRADATION |
| | | DATA SIZE |
| | | ROP |
| 2ND PAGE | TEXT | NUMBER OF OBJECTS |
| | | MAX POINT SIZE |
| | GRAPHICS | NUMBER OF OBJECTS |
| | | ROP |
| | IMAGE | RESOLUTION, GRADATION |
| | | DATA SIZE |
| | | ROP |

INFORMATION PROCESSING APPARATUS, INFORMATION PROCESSING METHOD, COMPUTER READABLE PROGRAM, AND STORAGE MEDIUM PRODUCT STORING COMPUTER READABLE PROGRAM

BACKGROUND OF THE INVENTION

1. Field of the Invention

The present invention relates to an information processing apparatus, an information processing method, a computer readable program, and a storage medium product storing a computer readable program. More particularly, the present invention relates to an information processing apparatus, method and program which are employed to produce printing data to be printed by a printing device, and a storage medium product storing a computer readable program.

2. Description of the Related Art

Conventionally, printing data creation processing (specifically processing by a printer driver) is executed in an information processing apparatus which creates printing data to be printed by a printing device (referred to as a "printer" hereinafter). The printer operates in a plurality of operation modes and printing conditions, e.g., a vector graphics printing mode in which the printer driver creates PDL data and the printer develops the PDL data (referred to as a "PDL mode" hereinafter) and a raster graphics printing mode in which the printer driver creates image data (referred to as an "image mode" hereinafter). In such a situation, for selection of the development mode (PDL mode and image mode), Japanese Patent Laid-Open No. 11-129583 has proposed a printing controller having the function of automatically selecting the printing mode.

In a conventional printer driver, the development mode may be automatically selected as required. However, a plurality of printing conditions (print setting information), such as color gradation and resolution, must be directly instructed by users on a print setting sheet for a printer driver, or are processed at fixed values. When users directly set the operation mode and the printing conditions, they are required to have sufficient knowledge to understand the characteristics of a document to be printed and a combination of the operation mode and the printing conditions which is optimum for the document characteristics. Therefore, it has been usual that many general users, who have not sufficient knowledge about the print processing, make printing with no changes in the initial settings of a printer driver and hence cannot obtain optimum printing results.

The above-described problem similarly arises in a printer driver having the function of automatically selecting the printing mode. When users are not contented with the printing conditions fixedly determined by the function of automatically selecting the printing mode, they must directly select the development mode and the various printing conditions. Thus, burdens imposed upon users in optimum print setting have been substantial.

SUMMARY OF THE INVENTION

Accordingly, in view of the problems described above, the present invention is intended to make the function of automatically selecting the development mode more convenient to users when the users employ a printer driver having the function of automatically selecting the development mode.

A first object of the present invention is to enable various items of print setting information designated in printing data to be also automatically selected when the development mode is automatically selected in a printer driver having the function of automatically selecting the development mode.

A second object of the present invention is to, to achieve the above first object, provide an environment allowing users to employ the automatic setting function more conveniently in a printer driver capable of automatically selecting the development mode, by preparing, in a user interface, not only an option for directly designating the development mode, but also an option for designating the function of automatically selecting the development mode and then presenting the option for designating the automatic selecting function as an initial default.

A third object of the present invention is to provide a printer driver capable of analyzing the contents of printing to determine the type of overall information to be printed, automatically setting various items of pint setting information in accordance with an analyzed result, and selecting print settings optimum for the contents of printing.

A fourth object of the present invention is to provide a user interface which, even when the development mode is automatically selected in a printer driver capable of automatically selecting print setting information, does not accept the setting made by users on print setting items to be automatically decided in an automatic decision mode, but accepts the setting made by users on print setting items that are allowed for users to set.

To achieve the above objects, an information processing apparatus according to one aspect of the present invention comprises a development mode deciding unit for automatically deciding which one of development modes is used, including a vector mode in which printing data described in the printer control language to be developed into image data by a printing device is created, and an image mode in which printing data described in an image mode to be used in printing by the printing device is created; and a print setting deciding unit for automatically deciding a plurality of print setting items in the printing data to be instructed to the printing device when the printing data is created in the development mode decided by the development mode deciding unit.

Preferably, the information processing apparatus further comprises a spool unit for spooling, as intermediate data, a printing instruction received from an application via an OS; and a discriminating unit for analyzing the spooled intermediate data and discriminating characteristics of information to be printed, wherein the development mode deciding unit and the print setting deciding unit make decisions in accordance with the characteristics of the information to be printed, which have been discriminated by the discriminating unit.

Preferably, the development mode deciding unit includes an option for designating one of the development modes including the vector mode and the image mode, and an option for designating an automatic selection mode of automatically deciding which one of the development modes is used, one of the two options being able to be manually designated.

Preferably, in the development mode deciding unit, the option for designating the automatic decision mode is set to an initial default.

Preferably, the information processing apparatus further comprises a printing data creating unit for creating, in the development mode, printing data that includes print setting information designated by the print setting items containing at least one of printing resolution, printing gradation and shade.

Preferably, the information processing apparatus further comprises a transmission processing unit for controlling a process of transmitting the printing data created by the printing data creating unit to the printing device via a network.

Also, a storage medium product storing a computer readable program, according to another aspect of the present invention, comprises a development mode decision module for automatically deciding which one of development modes is used, including a vector mode in which printing data described in the printer control language to be developed into image data by a printing device is created, and an image mode in which printing data described in an image mode to be used in printing by the printing device is created; and a print setting decision module for automatically deciding a plurality of print setting items in the printing data to be instructed to the printing device when the printing data is created in the development mode decided by the development mode decision module.

Further, an information processing apparatus according to still another aspect of the present invention comprises a development mode selecting unit allowing users to make selection to designate one of development modes including a vector mode in which printing data described in the printer control language to be developed into image data by a printing device is created, and an image mode in which printing data described in an image mode to be used in printing by the printing device is created, or to designate an automatic decision mode of automatically deciding which one of the development modes is used; a print setting unit for setting a plurality of print setting items in the printing data to be instructed to the printing device; and a user interface providing unit for providing a user interface which, when the automatic decision mode is selected, does not accept the setting made by users on those of the plurality of print setting items that should be automatically decided in the automatic decision mode, but accepts the setting made by users on those print setting items that are allowed for users to set.

Moreover, a storage medium product storing a computer readable program, according to still another aspect of the present invention, comprises a development mode selection module for providing a user interface which includes an option for designating one of development modes including a vector mode in which printing data described in the printer control language to be developed into image data by a printing device is created, and an image mode in which printing data described in an image mode to be used in printing by the printing device is created, and an option for designating an automatic decision mode of automatically deciding which one of the development modes is used; and a print setting module for setting a plurality of print setting items in the printing data to be instructed to the printing device; the development mode selection module providing a user interface which, when the automatic decision mode is selected, does not accept the setting made by users on those of the plurality of print setting items that should be automatically decided in the automatic decision mode, but accepts the setting made by users on those print setting items that are allowed for users to set.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a representation showing items displayed by a user interface in the embodiment;

FIG. 10 is a representation showing one example of a discrimination information to be collected in the embodiment;

DESCRIPTION OF THE PREFERRED EMBODIMENTS

A preferred embodiment of the present invention will be described below.

Figure 1:
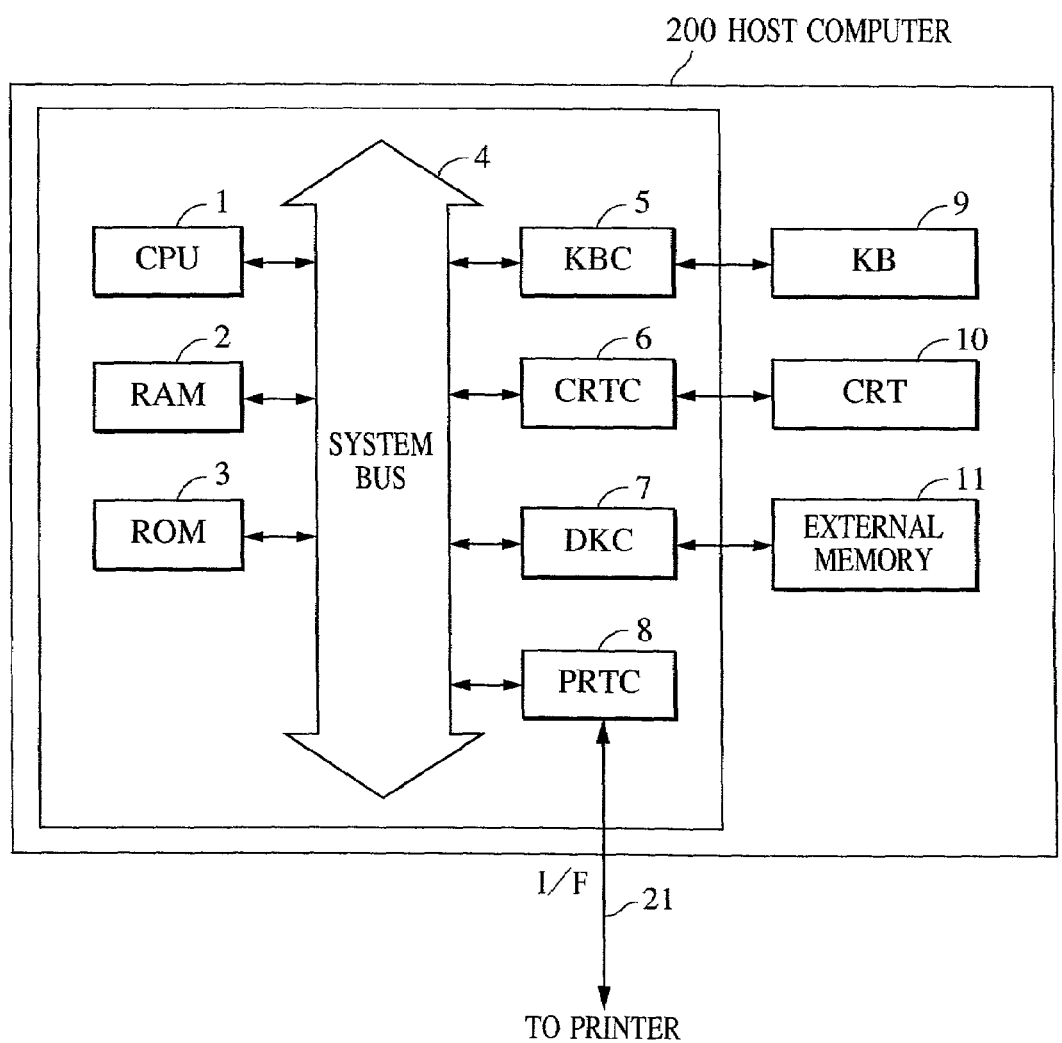
FIG. 1 is a block diagram showing a basic configuration on the side of a host computer to which a printing data processing apparatus according to an embodiment of the present invention is applicable.

FIG. 1 is a block diagram for explaining a basic configuration on the side of a host computer, including an information (printing data) processing apparatus, to which an embodiment of the present invention is applicable. In FIG. 1, a host computer 200 includes a CPU 1 for executing processing of documents, which contain figures, images, characters and tables (including spreadsheets) in mixed combinations, in accordance with a document processing program, etc. stored in a program ROM as part of a ROM 3 or in an external memory 11. The CPU 1 controls various devices connected to a system bus 4 in a supervising manner.

The ROM 3 or the external memory 11 also stores an operating system (OS) serving as a control program for the CPU 1, various data including font data used in the document processing, and so on. Numeral 2 denotes a RAM serving as, e.g., a main memory and a work memory for the CPU 1. A printer driver program, which is a printing control program for use in the present invention, is also read out of the ROM 3 or the external memory 11 into the RAM 2 and then controlled by the CPU 1. Numeral 5 denotes a keyboard controller (KBC) for controlling a user instruction inputted from a keyboard (KB) 9 or a pointing device such as a mouse (not shown). Numeral 6 denotes a CRT controller (CRTC) for controlling display on a CRT display (CRT) 10.

Numeral 7 denotes a disk controller (DKC) for controlling an access to the external memory 11, such as a hard disk (HD) and a floppy disk (FD), which stores a boot program, various applications, font data, user files, editing files, a printing control program (referred to as a "printer driver" hereinafter), and so on. Numeral 8 denotes a printer controller (PRTC) which is connected to a printer 100 via a predetermined two-way interface (I/F) 21 and executes communication control processing. The CPU 1 executes development processing (rasterizing) of outline font into a display information RAM, which is set, by way of example, in the RAM 2, so that WYSIWYG results are obtained from an image on the CRT 10. Also, the CPU 1 opens any of various registered windows in accordance with a command instructed by, e.g., a mouse cursor (not shown) on the CRT 10, and executes various kinds of data processing. When making printing, users open a window (user interface) related to the setting of printing provided by the printer driver, and performs setting of a printer, setting of printing conditions in the printing job, such as the resolution, gradation and page layout, and setting of a print processing method for the printer driver, including selection of the development (printing) mode.

Figure 2:
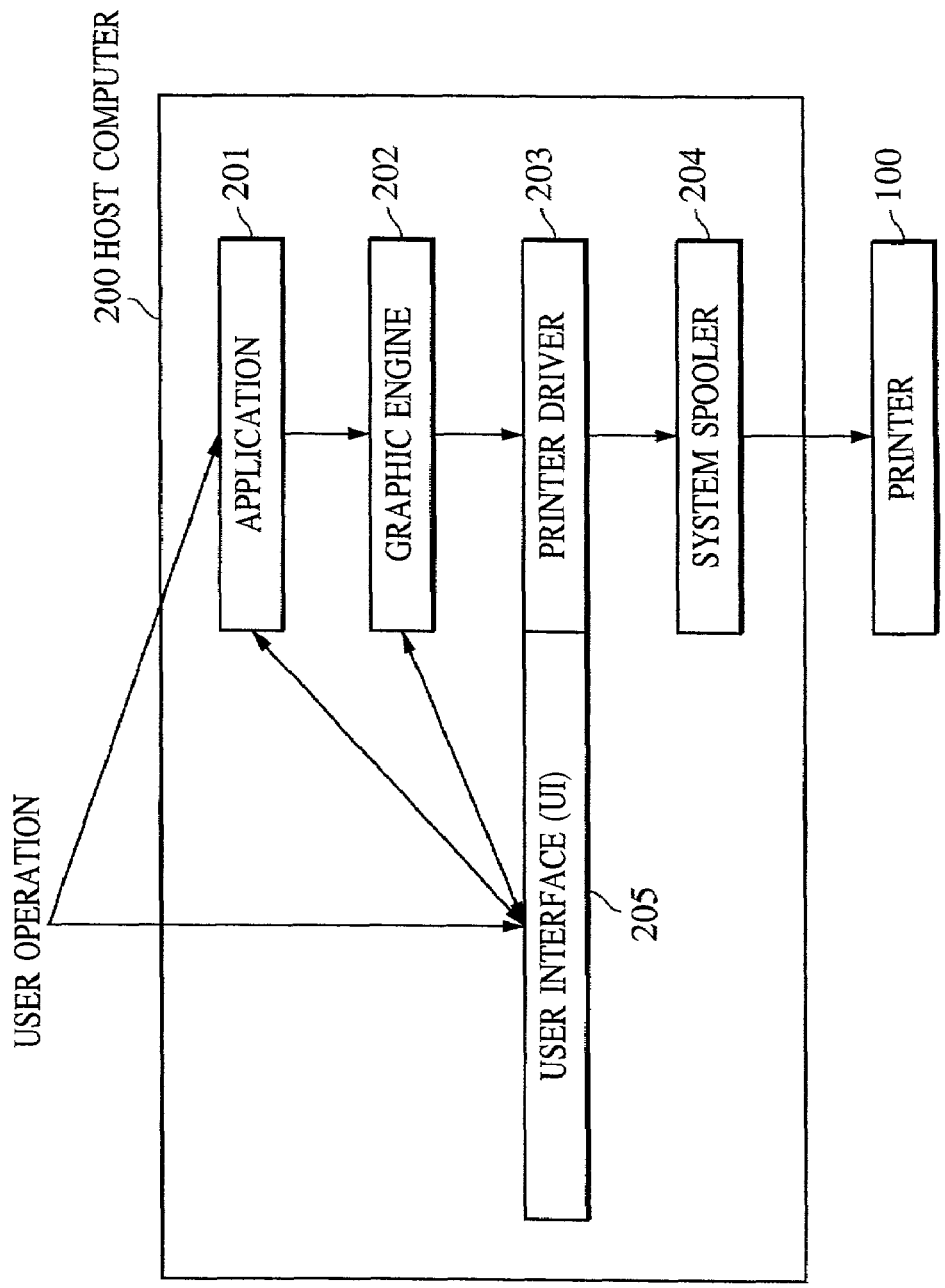
FIG. 2 is a block diagram for explaining a flow of printing data in the printing data processing apparatus.
Figure 3:
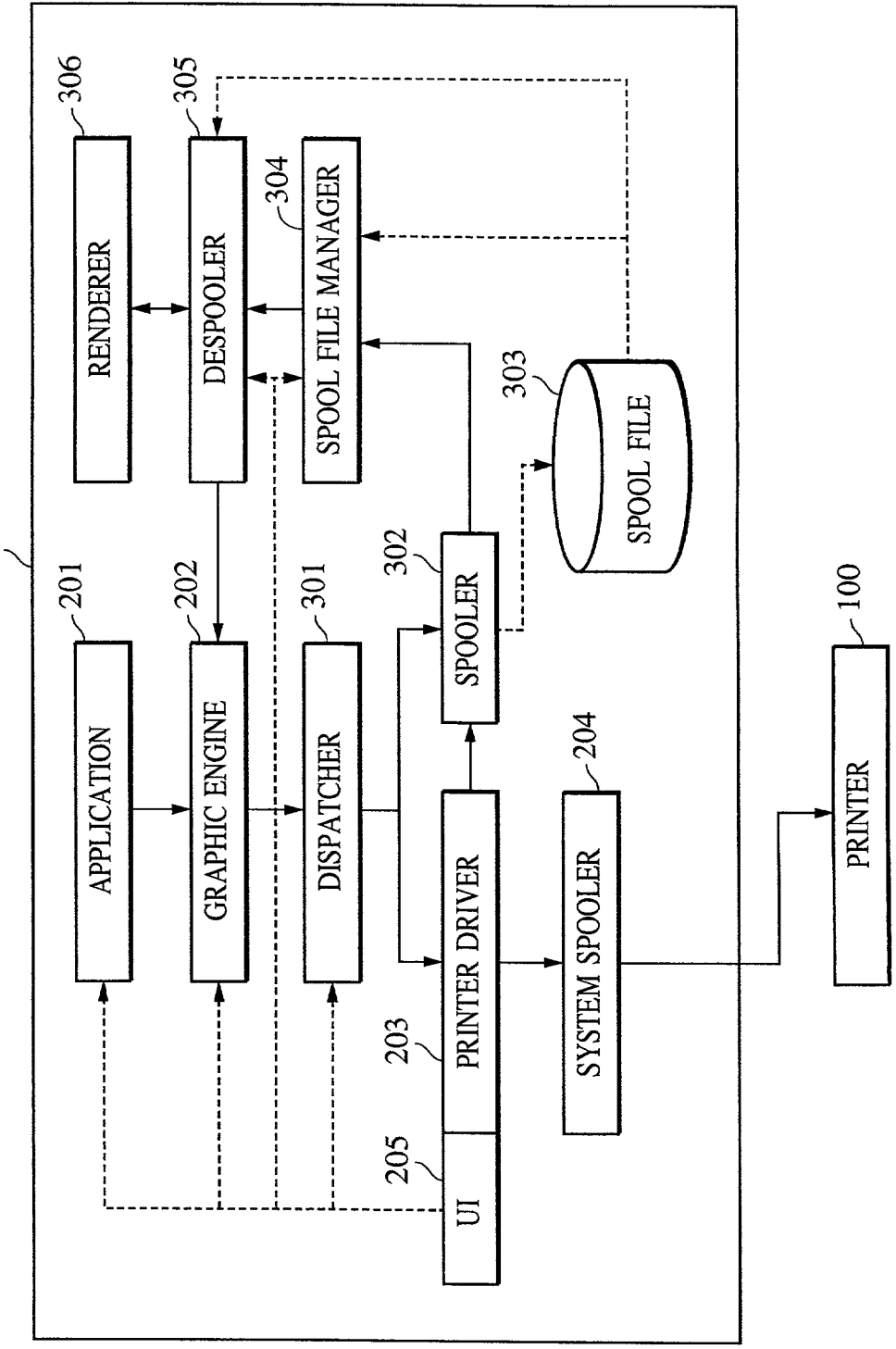
FIG. 3 is a block diagram for explaining a flow of printing data in the printing data processing apparatus.

FIGS. 2 and 3 are each a block diagram for explaining a flow of printing data in the printing data processing apparatus constructed as shown in FIG. 1. Each block diagram shows a configuration of general printing data creation processing in a host computer or a dedicated print server to which a printing device such as a printer is connected directly or via a network.

In FIG. 2, an application 201, a graphic engine 202, a printer driver 203, and a system spooler 204 are program modules which exist in the form of files stored in the external memory 11, such as a CD-ROM or a hard disk, and are each loaded into the RAM 2 by the OS or another module utilizing the loaded program module when it is executed.

Also, the application 201 and the printer driver 203 can be added to the external memory 11, such as a hard disk, from an FD and CD-ROM or via a network (not shown). The application 201 stored in the external memory 11 is loaded into the RAM 2 and then executed. When printing is made on the printer 100 from the application 201, the outputting (drawing) of printing data is performed using the graphic engine 202 that is also executable after being loaded into the RAM 2.

The graphic engine 202 similarly loads the printer driver 203, which is prepared along with a printing device, into the RAM 2 from the external memory. In Windows OS (trademark by Microsoft Corporation in USA), the graphic engine 202 is also called GDI (Graphic Device Interface) that defines an interface specified by the OS. Then, the graphic engine 202 converts a GDI function outputted from the application 201 into a DDI (Device Driver Interface) function that is interpretable by the printer driver 203, and outputs the DDI function to the printer driver 203.

The printer driver 203 creates printing data, based on which print processing is executed by the printer, using the DDI function inputted from the graphic engine 202. When printing data is created in the PDL mode, the printing data is made up of printer control commands (called also page description language (PDL)), and these printer control commands are outputted via the interface 21 to the printer 100 through a system spooler 204 that has been loaded in the RAM 2 by the OS. Also, when printing data is created in the image mode, a drawing data portion of the printing data is made up in the image mode, and is transmitted to the printer 100 in a similar manner.

An information processing apparatus of the present invention shown in FIG. 3 is an expanded version of that shown in FIG. 2. In the information processing apparatus shown in FIG. 3, when printing instructions are transmitted from the graphic engine 202 to the printer driver 203, a spool file 303 in the form of intermediate code is created before transmission to the printer driver 203.

Figure 4A:
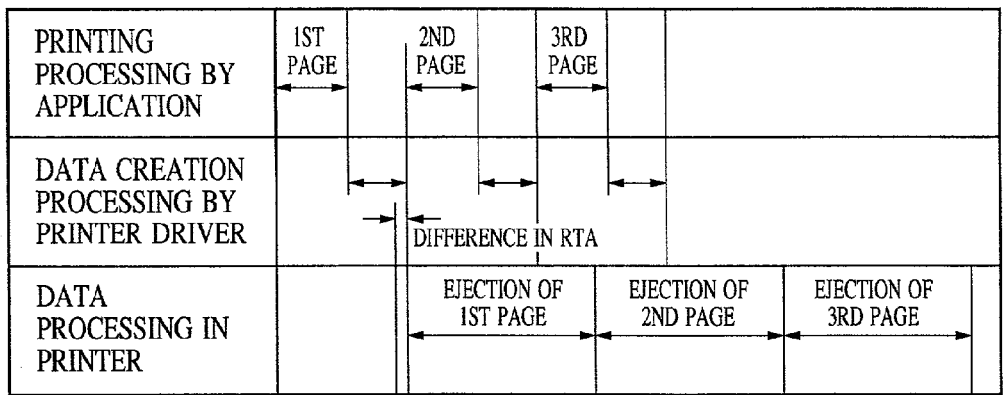
FIG. 4 is a time-series chart comparatively showing the operation of a driver in the configuration of FIG. 2 and the operation of a driver in the configuration of FIG. 3.
Figure 4B:
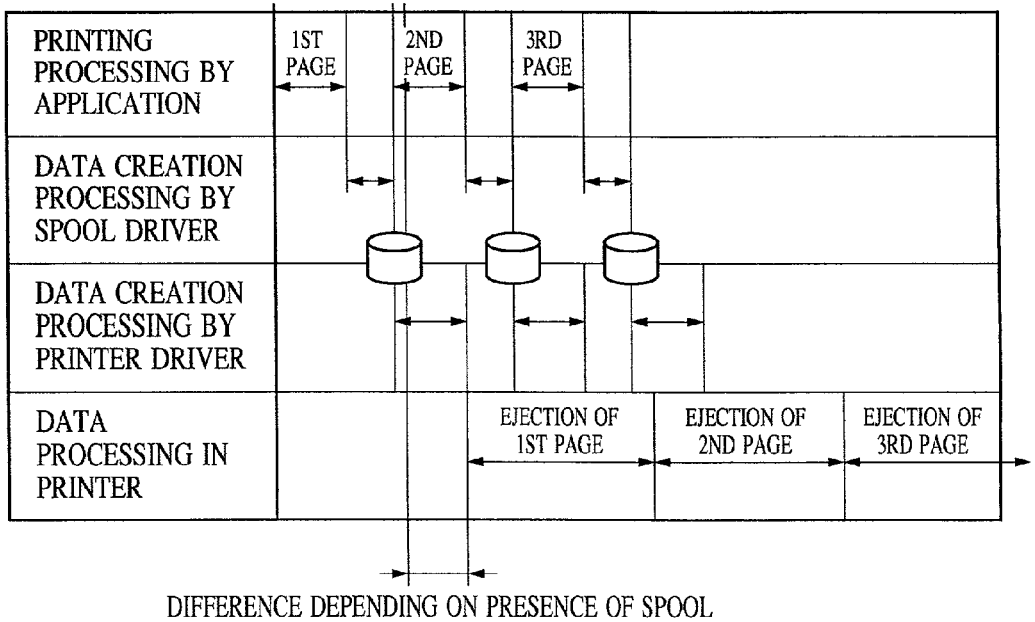

More specifically, in the information processing apparatus shown in FIG. 2, the application 201 is released from the print processing at the time when the printer driver 203 has completely converted all of printing instructions (DDI functions) from the graphic engine 202 into printing data including printer control commands. On the other hand, in the information processing apparatus shown in FIG. 3, the application 201 is released from the print processing at the time when a spooler 302 has completely converted all of printing instructions into intermediate code data and has outputted it to a spool file 303. Usually, from the standpoint of RTA (Return To Application), a period of time until RTA is shorter in the apparatus of FIG. 3. Looking at a period of time until the completion of outputting of printing results from the printing device, however, the apparatus of FIG. 3 tends to take a longer time corresponding to a time necessary for creating a spool file. FIG. 4 shows the relationship in RTA between both the apparatuses of FIGS. 2 and 3. That is, FIG. 4 is a time-series chart comparatively showing the operation of the driver in the configuration of FIG. 2 and the operation of the driver in the configuration of FIG. 3.

In the printing data processing apparatus shown in FIG. 3, it is possible during the process of creating the spool file 303 to analyze drawing information in a page and to carry out processing of data upon the contents of the created spool file 303. As a result, additional printing functions such as automatic selection of the optimum operation mode in match with the setting on the user interface 205, scaling-up and -down, and the so-called N-up printing with which a plurality of pages are printed in one page at a reduction scale, which are not provided in general applications, can be realized for the printing data from the application 201.

To that end, the printing data processing apparatus shown in FIG. 2 has recently been expanded to a system of spooling the printing instructions using the intermediate code data as with the printing data processing apparatus shown in FIG. 3. To carry out automatic selection of the optimum operation mode and processing of the printing data, users make setting on the widow of the user interface 205 provided by the usual printer driver 203, and the printer driver 203 stores the setting values in the RAM 2 or the external memory 11. Then, a spool file manager 304 or a despooler 305 refers to the stored setting values to realize the processing.

The configuration of FIG. 3 will be described below in more detail.

In the printing data processing apparatus shown in FIG. 3, a dispatcher 301 receives printing instructions from the graphic engine 202. When the printing instruction received by the dispatcher 301 from the graphic engine 202 is one issued from the application 201 to the graphic engine 202, the dispatcher 301 loads the spooler 302 stored in the external memory 11 into the RAM and delivers the printing instruction to the spooler 302 instead of the printer driver 203. The spooler 302 converts the received printing instruction into an intermediate code and outputs the converted intermediate code to the spool file 303.

The spool file 303 is not a single file, but means a group of several files. Before the conversion into the intermediate code, the spooler 302 analyzes in detail the information regarding, e.g., which type of printing instruction has been received and what load will be imposed on the printer side by the received printing instruction. This analyzing process is performed to realize the automatic selection of the optimum operation mode. Then, a result of the analyzing process is stored as another spool file in the spool file 303. Furthermore, the spooler 302 acquires the processing setting information related to printing data, which has been set for the printer driver 203, from the printer driver 203 and stores it in the spool file 303. While the spool file 303 is created as a group of files in the external memory 11 in the embodiment, it may be created in the RAM 2. In addition, the spooler 302 loads, into the RAM 2, the spool file manager 304 stored in the external memory 11 and then notifies the status in creation of the spool file 303 to the spool file manager 304.

Subsequently, the spool file manager 304 determines whether the printing can be made using the graphic engine 202 in accordance with the contents of the processing setting information related to printing data, which is stored in the spool file 303. When it is determined that the printing can be made, the spool file manager 304 loads, into the RAM 2, the despooler 305 stored in the external memory 11 and then instructs the despooler 305 to perform print processing of the intermediate code described in the spool file 303.

The despooler 305 processes the intermediate code contained in the spool file 303 in accordance with the analyzed result of the optimum operation mode and the contents of the processing setting information, which are also contained in the spool file 303. If necessary, the despooler 305 develops the intermediate code into image data at a high rate using a renderer 306 incorporated in the despooler. The determination as to whether the intermediate code should be developed into image data is synthetically made by an optimization determining unit in the despooler 305, which reads the file containing the result of the analyzing process executed by the spooler 302 and takes it into account along with other information such as the processing setting information set for the printer driver 203. That determination may be carried out in units of page or in units of drawing object. In any case, the despooler 305 reads the intermediate code out of the spool file 303, converts the intermediate code into the form adapted for an API (Application Programming Interface) of the graphic engine 202, and outputs the converted data via the graphic engine 202 again.

When the printing instruction received by the dispatcher 301 from the graphic engine 202 is one issued from the despooler 305 to the graphic engine 202, the dispatcher 301 switches over a processing target from the spooler 302 to the printer driver 203. The printer driver 203 creates printer control commands and outputs the commands to the printer 100 via the system spooler 204.

Figure 5:
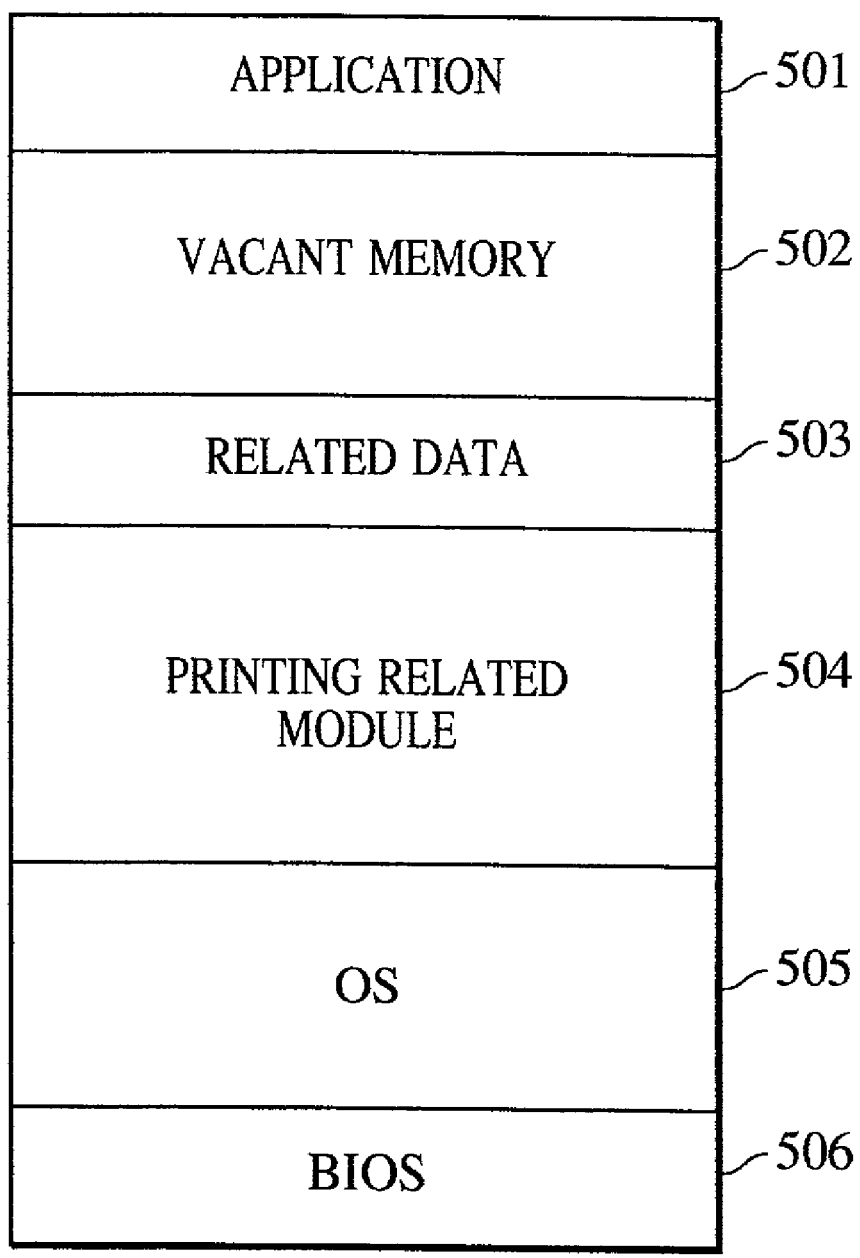
FIG. 5 is a representation showing one example of a memory map prepared on a RAM of the host computer shown in FIG. 1.

FIG. 5 shows one example of a memory map prepared on the RAM 2 of the host computer 200 shown in FIG. 1. The illustrated memory map is in a state where a printing related module 504 including a series of printing data creation processing programs for use in this embodiment, an application 501, related data 503, an OS 505, and a BIOS 506 are loaded in the RAM 2 of the host computer 200 to be ready for execution. Incidentally, numeral 502 denotes a vacant memory.

The printing related module 504 contains various modules for constituting the present invention. More specifically, the printing related module 504 comprises a development mode decision module, a print setting decision module, a spool processing module, a discrimination module, a printing data creation module, and a transmission processing module.

Those program modules are executed by the CPU 1.

The development mode decision module is a program module for automatically deciding which one of development modes is used, including a vector mode in which printing data described in the printer control language to be developed into image data by the printing device is created, and an image mode in which printing data described in an image mode to be used in printing by the printing device is created. In this embodiment, the development mode decision module is a program module for providing a user interface that has an option for designating one of the development modes including the vector mode and the image mode, and an option for designating an automatic decision mode of automatically deciding which one of the development modes is used. Those options are defined such that one of them can be manually decided by the user. Also, the decision in each of the development mode decision module and the print setting decision module is made, as described later, based on characteristics of information to be printed, for which the above-mentioned analyzing process is performed.

The print setting decision module is a program module for automatically deciding a plurality of print setting items in the printing data, which are to be instructed to the printing device, when the printing data is created in the development mode decided by the development mode decision module.

The spool processing module is a program module for spooling the printing instruction, which is received from the application via the OS, in the form of a spool file as intermediate data.

The discrimination module is a program module for analyzing the intermediate data of the spool file and discriminating characteristics of the information to be printed.

The printing data creation module is a program module for creating the printing data containing the print setting information that is designated in the development mode by the print setting items including at least one of printing resolution, printing gradation and shade.

The transmission processing module is a program module for controlling a process of transmitting the printing data, which is created by the printing data creation module, to the printing device via the network.

Further, the development mode decision module provides a user interface which, when the automatic decision mode is selected, does not accept the setting made by the user on those of a plurality of print setting items that should be automatically decided in the automatic decision mode, but accepts the setting made by users on those print setting items that are allowed for the user to set.

The automatic selection processing of the optimum printing mode will be described below.

When carrying out the print processing from application software having the function to create a document, printing information in the intermediate form, which does not depend upon any particular PDL, is created and temporarily stored in a storage. The optimum operation mode is then decided by analyzing the stored printing data.

In this embodiment, the printer driver includes an image driver for carrying out processing up to rendering of a print image, and a PDL driver for carrying out rendering on the printing device side by employing the PDL (Printer Description Language) equipped on the printing device side. In that printer driver, the automatic selection processing of the optimum printing mode is executed, by way of example, as follows.

Figure 6:
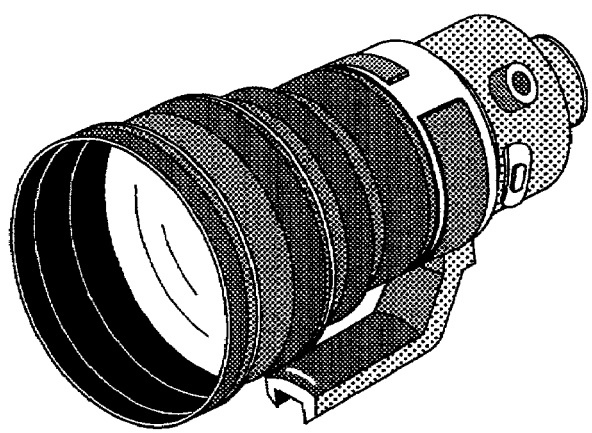
FIG. 6 is a representation showing one print sample for which users are apt to erroneously set the operation mode.

A description is made on an example in which a document with a photograph, shown in FIG. 6, is printed by a color LBP. A photograph area in FIG. 6 is made up of image data with a very high resolution and gradation (specifically 600 dpi at the original size and 8 bits for each of RGB). Since this document appears a simple one at a glance, the PDL driver seems to be suitable for processing the document. However, if this document is converted into PDL commands, redundant image information in comparison with the image quality capable of being printed by the printer is delivered from the printer driver. In fact, therefore, the document can be processed at a higher rate by using the image driver.

Thus, there is a printing document for which users cannot judge at a glance which one of the printing modes should be used. This problem can be avoided if the amount of image data transmitted to the printer is determined in advance. To that end, when carrying out the print processing from application software, the printer driver of this embodiment in the configuration of FIG. 3 creates printing information in the intermediate form, which does not depend upon any particular PDL. Then, on that occasion, the printer driver estimates two values from the printing information in the intermediate form including image data, i.e., the number of bytes resulting when the image data is converted into the PDL commands and the number of bytes resulting when the print image is developed beforehand in the renderer on the host side in match with the output resolution and the output gradation on the printer side. The print processing can be performed at a higher rate by comparing the two estimated values and executing the drawing in the mode having a smaller number of bytes.

In the printer driver of this embodiment, therefore, when such printing data as shown in FIG. 6 is processed, the operation of developing image data on the host side is automatically selected as the optimum printing mode.

The automatic selection processing of the optimum printing mode is performed as described above, but the mode selected by the automatic selection processing is often not an optimum one for all users. For example, even when the automatic selection processing outputs a gradation of 2 bits, some users may not require the gradation of 2 bits and may prefer higher-rate processing at a gradation of 1 bit.

The present invention has been made in view of that point. More particularly, the present invention is able to provide appropriate print processing, which requires no user operation, by representing default values, which have not yet been changed by the user operation, in the UI for designating the printing mode so as to designate the automatic print processing.

Also, in the case of automatically deciding the development mode to perform the print processing, since the print setting items designating printing characteristics are automatically decided to proper values by the printer driver, a proper printing output can be obtained without requiring user to take into account the detailed print setting.

Furthermore, the printer driver provides such a user interface as, in the state of designating the automatic print processing, not allowing users to designate the print setting items for which printing characteristics can be automatically decided, but allowing users to designate the print setting items for which printing characteristics cannot be automatically decided. As a result, the automatic selection processing of the optimum printing mode can be performed in a manner that is intuitively simpler and easier for understanding by users.

Figure 7:
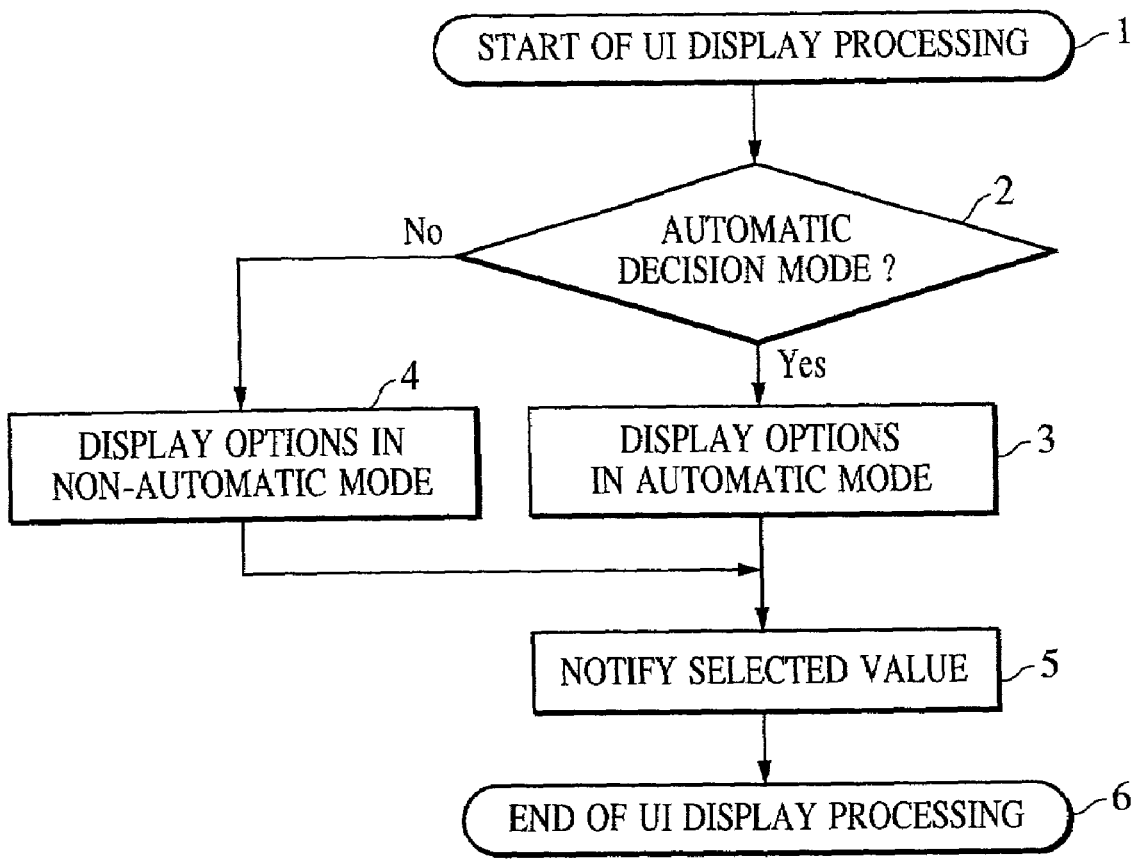
FIG. 7 is a flowchart showing one example of the printing data processing procedures executed in the printing data processing apparatus according to the present invention.

The user interface 205 realized in the present invention will be described below with reference to a flowchart of FIG. 7. In response to a request from a user or application, the CPU 1 starts user interface processing by using the various modules of the printer driver (step 1). The CPU 1 then determines whether the current development mode in the printer driver is set to the automatic decision mode (step 2).

Based on a determined result, the CPU 1 displays options for setting the printing conditions in accordance with a table (FIG. 8) listing therein beforehand which ones of the printing conditions are made settable by users. When the development mode is now in the automatic decision mode, the CPU 1 displays a user interface, shown in FIG. 9, by employing the development decision module.

At this time, when the automatic decision mode "AUTO MODE" is selected, the printer driver program modules in the present invention displays the user interface in which the options for the "AUTO MODE" are represented. Among a plurality of print setting modes, the print setting modes to be automatically decided in the automatic decision mode are displayed so as not to accept the setting by the user (that is, displayed in a gray-out fashion as indicated by 902 in FIG. 9), and the print setting modes settable by users are displayed so as to accept the setting by the user (that is, displayed in a pull-down fashion as indicated by 903 in FIG. 9). A screen image of such a user interface is then displayed on the CRT 10 (step 3). The print setting items include not only "Mode Details" for setting the printing rate, "Gradation" for setting a value of printing gradation, "Color Halftones" for setting a shade, but also a printing resolution, gray compensation, print layout and so on. In particular, the print layout related to the finishing is not related to the development mode, and therefore it can be selectively inputted by the user regardless of which one of the development mode and the automatic decision mode is selected. Incidentally, at the time when the printer driver is installed, the initial (default) values are displayed on condition that the automatic decision mode "AUTO MODE" is selected.

If it is determined that the current mode is not the automatic decision mode (but the PDL mode or the image mode), options in the non-automatic mode are displayed. More specifically, based on the printer driver program modules in the present invention, the CPU 1 displays an option "CPDL (Color PDL) Mode" among the options indicated by 901 in FIG. 9 to be selectable when the current mode is the PDL mode (vector mode), and displays an option "Raster Mode" among them to be selectable when the current mode is the image mode (raster mode) (step 4). Then, depending upon the current development mode, the user interface is displayed so as to accept entry of the corresponding print setting items.

Subsequently, the CPU 1 notifies the values selected in the property (FIG. 9) of the printer driver to the OS, and registers the selected values in DEVMODE (step 5). DEVMODE is a structure file defined by Windows OS, and holds various print settings therein. In the print processing, DEVMODE is read by the printer driver and is employed to create the printing data.

After the selected values have been notified, the printer driver program brings the user interface display processing to an end (step 6).

Thus, by deciding the print setting items, which are made settable by users, in advance depending on each development mode, it is possible even in the automatic decision mode to display the printing conditions that can be explicitly set by users, and not to display the printing conditions that are automatically set.

Figure 9:
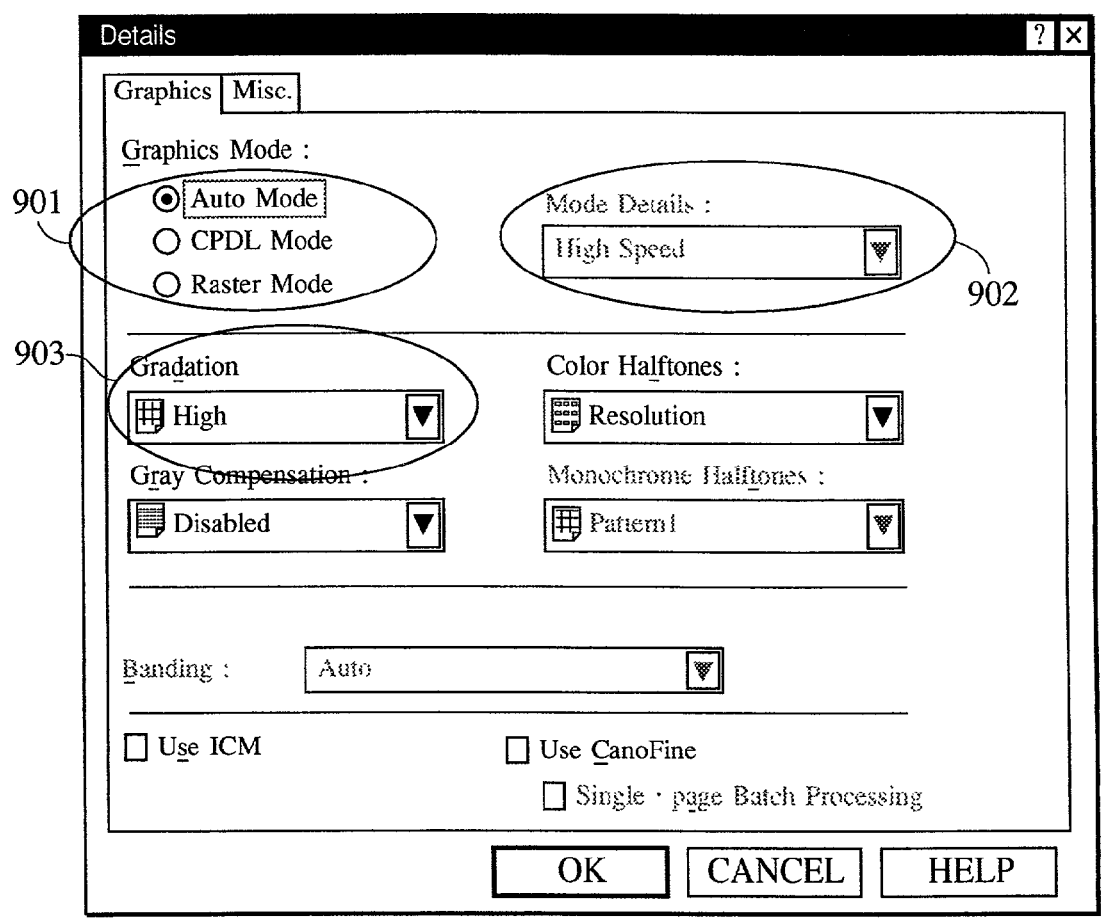
FIG. 9 is a representation showing one example of a screen image of the user interface in the embodiment for inquiring to a user.

To describe the above-mentioned process in connection with an example of the UI in this embodiment with reference to FIG. 9, even when there are two printing modes 901, i.e., "CPDL" and "Raster", "AUTO" meaning the automatic decision mode is additionally prepared and set to provide the default values. Among the printing conditions displayed in the "AUTO" mode, the automatically set items are displayed in a state not allowing users to select them as indicated by 902, and the items explicitly settable by users are displayed in a state allowing users to select them as indicated by 903.

The printer driver, which operates in accordance with the setting made on the UI when the print processing is carried out from application software, is realized, by way of example, in the configuration of FIG. 3.

The spool module of the printer driver creates printing information in the intermediate state that does not depend upon any particular PDL, and temporarily stores it in a storage means. Then, the printer driver analyzes the stored printing data, automatically decides the optimum operation mode, and executes the print processing. When the printing information in the intermediate state is created in the spooler 302 of FIG. 3, the discrimination information necessary for deciding the optimum operation mode, shown in FIG. 10, is also collected and stored along with the contents of the printing information. To explain the discrimination information shown in FIG. 10 in more detail, it is mainly divided into general information related to the printing job and information related to the contents of drawing for each page. The former general information contains, e.g., the printing date, the printing operator, the name of file to be printed, the creation date and updating date of the file, the name and version No. of application software executing the printing, the setting made on the UI of the printer driver UI (driver operating status) in the printing, and the total number of pages in the printing job. The latter information related to the contents of drawing for each page is classified three major drawing objects, i.e., text, graphics and image. For each drawing object, the information necessary for discrimination is collected, by way of example, as follows. For the text, the number of characters and the number of maximum character size (point) in each page are collected and stored. For the graphics, the total number of graphic objects present in each page, and information indicating whether designation of logic drawing (ROP) is made in the drawing are collected. For the image, the resolution, etc. of an image to be drawn are also collected in addition to the information collected for the graphics.

In the despooler 305 (corresponding to the development mode decision module) of FIG. 3, the structure of a document is discriminated for each page based on the discrimination information stored by the spooler, and the printing mode is decided. More specifically, for text information, the despooler compares the maximum point size with a certain threshold value. When the maximum point size is greater than the threshold value, the despooler determines that the rendering on the host side is more effective, and when the maximum point size is smaller than the threshold value, it determines that the rendering on the printer side is more effective. For graphics information, the despooler compares the number of objects with a certain threshold value. When the number of objects is greater than the threshold value, the despooler determines that the rendering on the host side is more effective, and when the maximum point size is smaller than the threshold value, it determines that the rendering on the printer side is more effective. For image information, the despooler estimates the number of data delivered in the form of PDL commands to the printer based on the information of resolution, gradation and drawing area. When the estimated value is greater than the image size resulting when the process covering from rendering to half-toning is carried out on the host side, the despooler determines that the rendering on the host side is more effective, and when the estimated value is smaller than that image size, it determines that the rendering on the printer side is more effective. For ROP, if the ROP number not supported on the printer side is designated, the despooler determines that the rendering on the host side is more effective, and if not so, it determines that the rendering on the printer side is more effective.

Further, during the above-described processing, the despooler 305 (corresponding to the development mode decision module) also automatically determines a plurality of print setting items which are suitable in creating the printing data in the development mode determined as described above.

Figure 11:
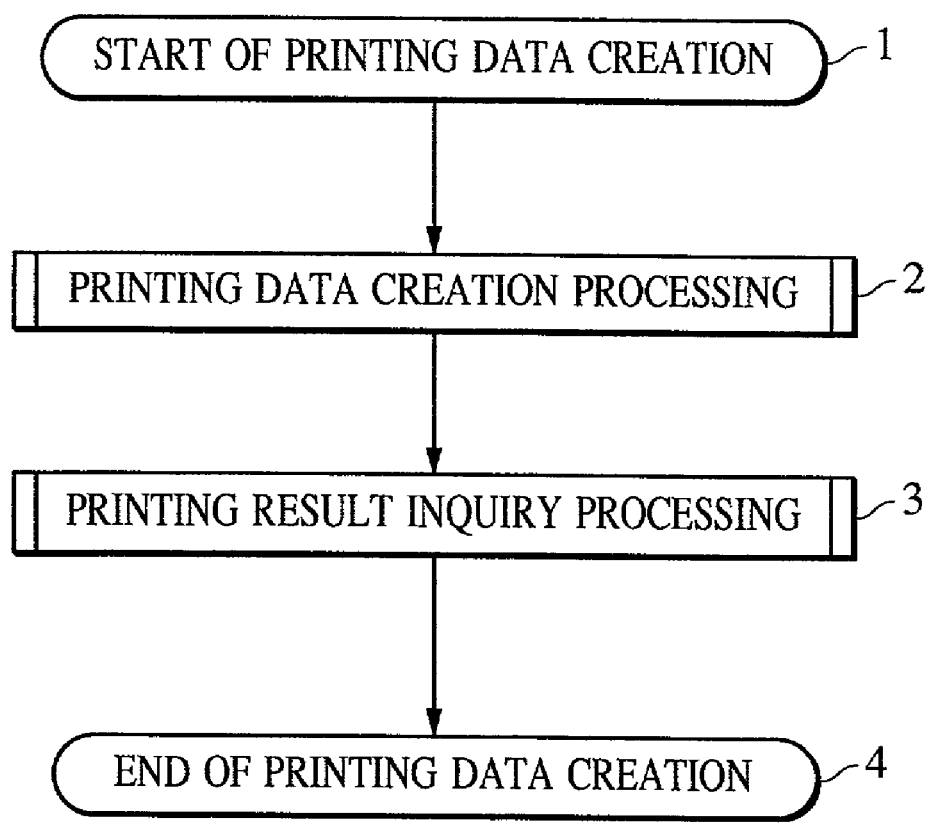
FIG. 11 is a flowchart showing one example of the printing data processing procedures executed in the printing data processing apparatus according to the present invention.

A series of steps for the print processing in the present invention will be described below with reference to a flowchart of FIG. 11.

Figure 12:
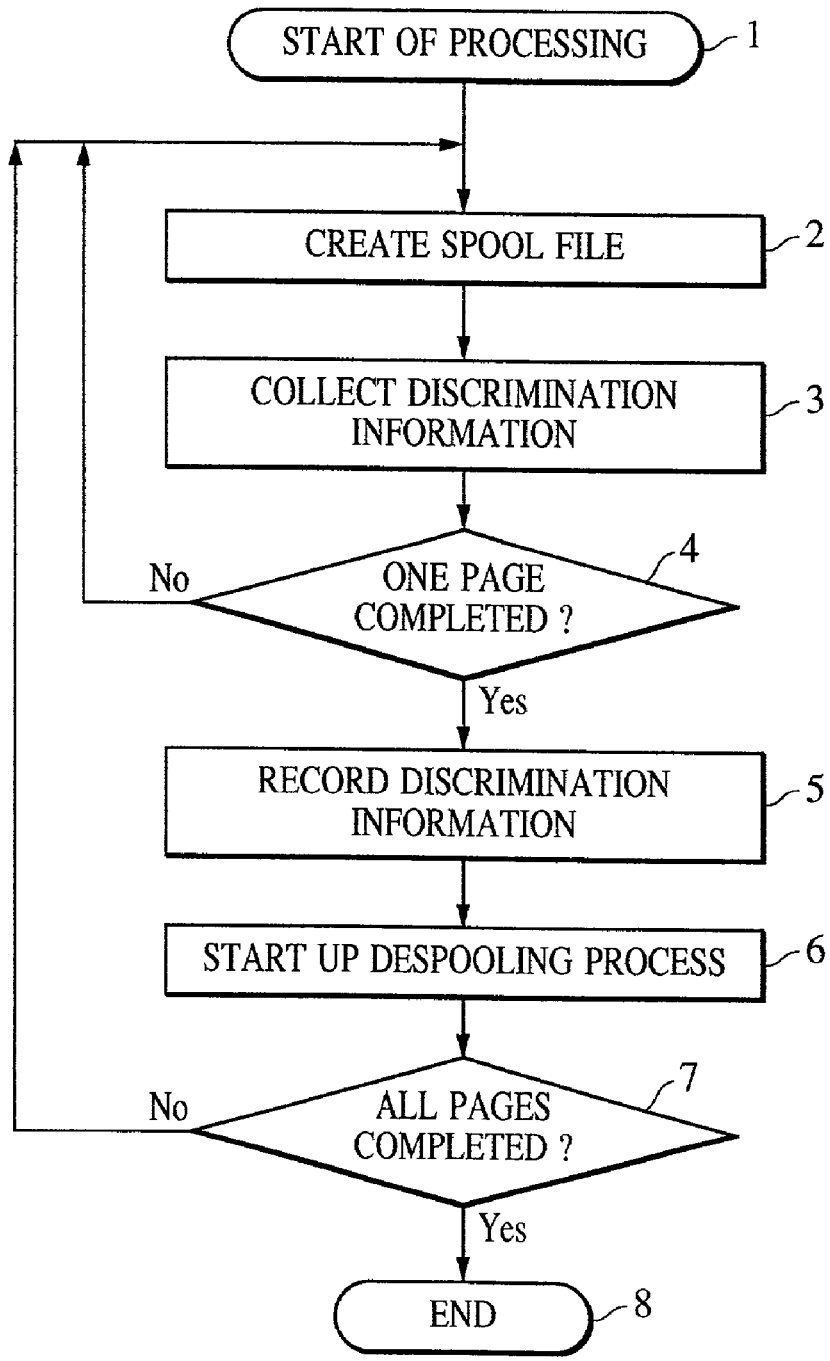
FIG. 12 is a flowchart showing one example of the printing data processing procedures executed in the printing data processing apparatus according to the present invention.
Figure 13:
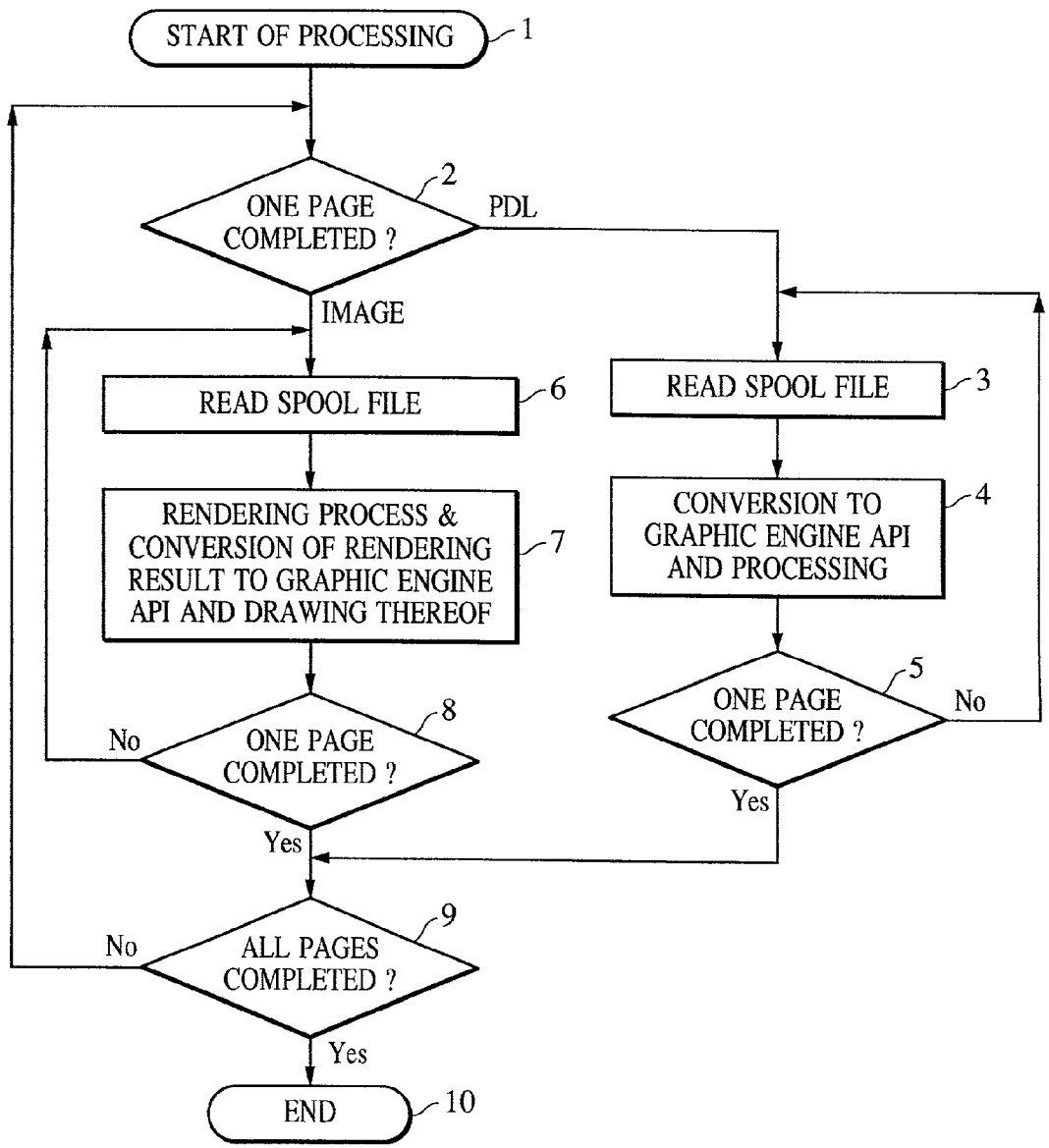
FIG. 13 is a flowchart showing one example of the printing data processing procedures executed in the printing data processing apparatus according to the present invention.
Figure 14:
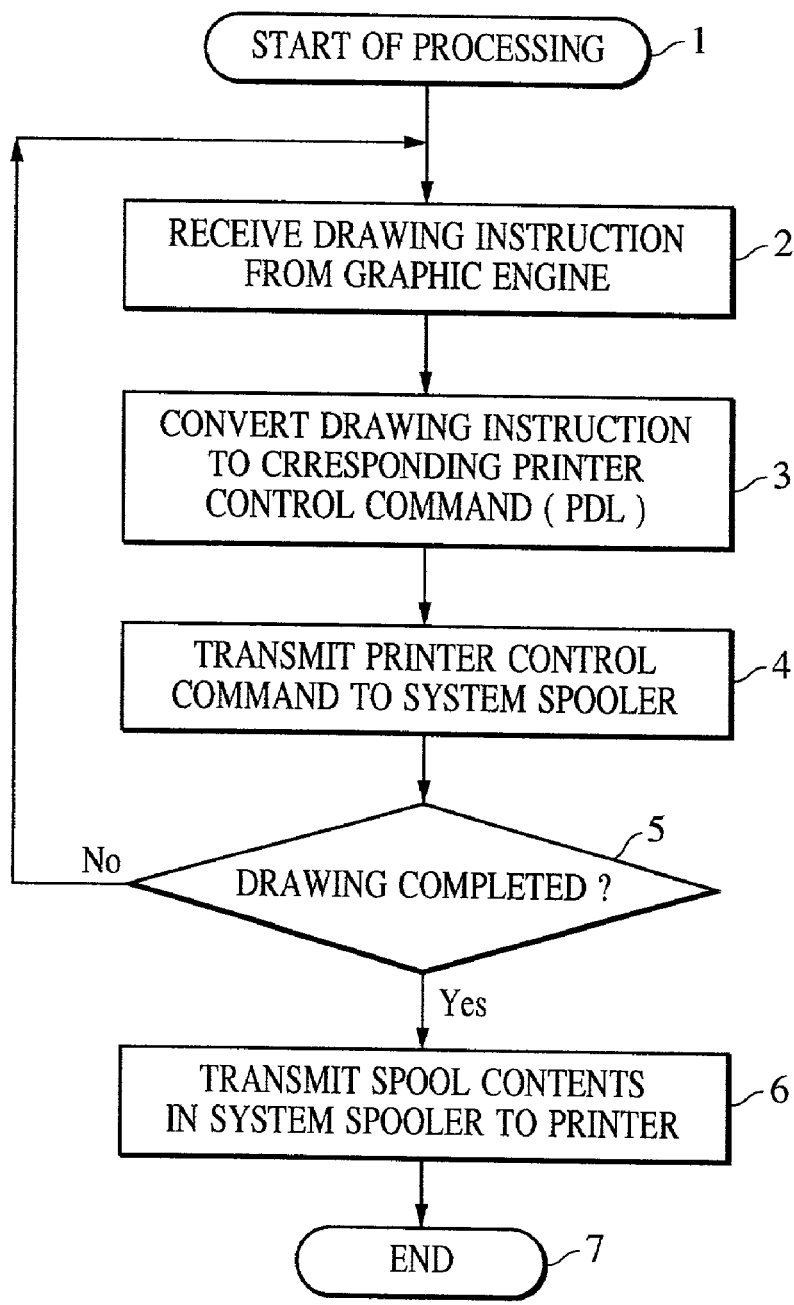
FIG. 14 is a flowchart showing one example of the printing data processing procedures executed in the printing data processing apparatus according to the present invention.

When the printer driver receives a printing request from the application through the OS (step 1), it executes the printing data creation processing (step 2). FIGS. 12, 13 and 14 are flowcharts for explaining the step 2 in FIG. 11, which is the print processing executed by the printer driver having the configuration of FIG. 3. More specifically, a processing flow of FIG. 12 represents the processing executed by the spooler in FIG. 3, a processing flow of FIG. 13 represents the processing executed by the despooler in FIG. 3, and a processing flow of FIG. 14 represents the processing executed by the printer driver in FIG. 3.

In the flowchart of FIG. 12, when various necessary initializations are performed and the print processing is started in processing start step 1, the printing information (DDI function) issued by the OS is passed from the graphic engine 202 to the spooler 302. The spooler 302 (spool module) spools the contents of the printing information in the spool file 303 as one file in the form of intermediate printing information (intermediate form) that does not depend upon any particular PDL (step 2). Then, the spooler 302 (discrimination information collecting module) also collects the discrimination information shown in FIG. 10 (step 3).

The spooler 302 executes the steps 2 and 3 for all of data in one page (step 4). After completion of the processing for one page, the spooler 302 spools the discrimination information collected in the step 3, as another file, in the spool file 303 (step 5).

The information processing to be spooled by the spooler 302 is thereby ended. At this time, therefore, the spooler 302 starts up the despooler, which operates as another process, via the spool file manager 304 (step 6). If the despooler has been already started up at that time, the step 6 is skipped. Since the despooler operates as another process on another time-serial base, the processing executed by the despooler will be separately described with reference to FIG. 13.

In step 7, the spooler 302 checks whether the processing for all of the pages has been completed. If not completed, the spooler 302 repeats the above-described processing from the step 2. If the processing for all of the pages has been completed, the processing in the spooler is ended (step 8).

A flow of the processing in the despooler 305 will be described below with reference to the flowchart of FIG. 13. When various necessary initializations are performed and the despooling is started in processing start step 1, the despooler 305 reads the discrimination information for each page (step 2). Based on the discrimination information, the despooler 305 (corresponding to the development mode decision module) determines for each page which one of the development modes, i.e., the vector mode (PDL mode) of creating the printing data in the printer control language to be developed into image data by the printing device and the image mode of creating the printing data in an image mode to be used in printing by the printing device, is more effective.

If it is determined that the page should be subjected to the image development processing on the printer side, the control flow proceeds to step 3, and if it is determined that the page should be subjected to the image development processing on the host side, the control flow proceeds to step 6.

In the step 3, the despooler 305 (corresponding to the print setting decision module) opens the file which is stored in the spool file 303 and includes the contents of the drawing data and various drawing attributes spooled therein, reads the contents from the head, and automatically decides a plurality of print setting items of the printing data in the vector mode (PDL mode) based on the printing characteristics such as the drawing data and various drawing attributes. For example, when the drawing data to be printed is only a monochrome text, the despooler 305, i.e., the development mode decision module for automatically deciding the print setting items, sets the printing resolution to "high resolution", the printing gradation to "low gradation (2 bits with dithering) or to " no gradation (1 bit without dithering), and the banding to "band control". Herein, the term "banding" means an option for deciding one of "band control" in which one page is divided into a plurality of areas, i.e., bands, perpendicularly to the sheet feeding direction and the image development processing is executed in units of band for each subsequent band in parallel to outputting of a video signal to an image processing unit, and "page control" in which outputting of a video signal to the image processing unit is started after the development of image data for one page. Then, in step 4, the despooler 305 executes, in accordance with the print setting items decided in the step 3, the conversion of the spooled intermediate data in the form of printing information of the intermediate state into the form (GDI function) in match with API provided by the graphic engine 202, and also executes the requested print processing again by using the function of the graphic engine 202. In step 5, the despooler 305 checks whether the printing information for one page has been reproduced, and if not yet completed, it repeats the processing steps 3 and 4.

On the other hand, if it is concluded from the determination for each page that the rendering should be performed on the host side, the control flow proceeds to step 6. In the step 6, the despooler 305 opens the file in which the contents of the drawing data and various drawing attributes are spooled, reads the contents from the head, and automatically decides a plurality of print setting items of the printing data in the image mode based on the printing characteristics such as the drawing data and various drawing attributes. Then, in step 7, the despooler 305 executes the conversion of the spooled intermediate data in the form of printing information of the intermediate state into the form in match with API provided by the renderer, for rendering of the printing information into a print image. As a result of the rendering, an image is provided. The despooler 305 converts the image into the form in match with API provided by the graphic engine 202 and executes the requested print processing again by using the function of the graphic engine 202.

After completion of the processing for the information of one page (step 8), the despooler 305 checks in step 9 whether the processing for all of the pages has been completed, and if there remains any page data not yet processed, it repeats the processing from the step 2. If the despooling of all of the pages has been completed, the processing in the despooler is ended (step 10).

In the flow of processing described above, the drawing process is performed with an API call of the graphic engine, and that process is executed as another separate process. More specifically, the graphic engine executes the print processing in dynamic link with the printer driver. A processing flow in the printer driver will now be described with reference to FIG. 14. FIG. 14 is a flowchart showing one example of the printing data processing procedures executed in the printing data processing apparatus according to the present invention. In the flowchart, numerals 1 to 7 denote a series of successive steps. First, the printer driver 203 receives a drawing instruction from the application 201 via the graphic engine 202 (step 2). Then, the printer driver 203 converts each drawing instruction (e.g., drawing of a line) into corresponding printer control (drawing) command data (step 3), and the system spooler 204 spools the converted command data in, e.g., the RAM 2 or the external memory 11 (step 4). Subsequently, the printer driver 203 determines whether the drawing process by the application 201 and the graphic engine 202 has been completed (step 5). If not completed, the printer driver returns to the step 2 and repeats the similar processing as described above. On the other hand, if it is determined in the step 5 that the drawing step has been completed, the system spooler 204 transmits the spooled printer control command data to the printer 100 (step 6), thereby ending the processing. The above-described printer control command creation processing (called the vector graphics printing mode) executed by the printer driver 203 has a feature that a printer control (drawing) command providing a geometric representation, such as a line, corresponding to the vector graphics is transmitted to the printer 100. Therefore, the creation (rasterizing) of a printing image is carried out by the drawing processing system and the program in the printer 100. In this case, a time required for the print processing in the printer 100 is determined depending upon the type of object and the number of objects.

By constructing the printer driver as described above, a printing data processing apparatus having a simpler automatic setting capability can be achieved with the printer driver which can automatically set the printing mode and the printing conditions.

As another embodiment, the printing data processing apparatus may include a plurality of image drivers, or a plurality of different PDL drivers, or a plurality of image drivers and a plurality of PDL drivers in a mixed combination.

Figure 15:
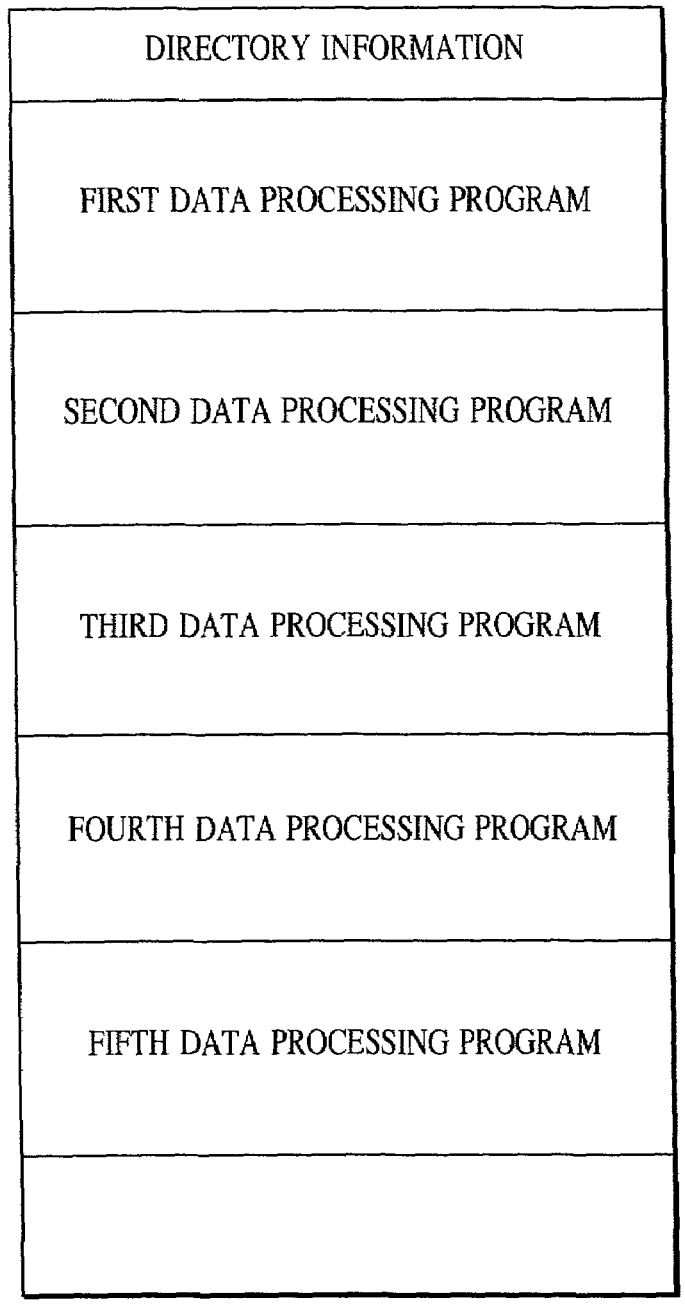
FIG. 15 is a representation for explaining a memory map prepared in a storage medium storing various data processing programs readable by a printing system to which the printing data processing apparatus according to the present invention is applicable.

FIG. 15 is a representation for explaining a memory map prepared in a storage medium storing various data processing programs readable by a printing system to which the printing data processing apparatus according to the present invention is applicable.

Though not particularly shown, the storage medium may further store information for managing a group of programs stored in the storage medium, such as version information and the name of creator, and information depending upon the OS, etc. on the program reading side, such as an icon for displaying the program for identification.

The data belonging to the various programs is also managed in a directory of the storage medium. In addition, the storage medium may store, e.g., a program for installing the various programs in a computer and a program for decompressing the installed program when it is compressed. The processing of FIGS. 7, 11, 12, 13 and 14 in the above-described embodiment may be executed by the host computer in accordance with programs externally installed. In such a situation, the present invention is also applicable to the case where an information group including programs is supplied to an output device from a storage medium such as a CD-ROM, flash memory and FD, or from an external storage medium via a network.

As a matter of course, the object of the present invention can also be achieved by supplying, to a system or apparatus, a storage medium which stores program codes of software for realizing the functions of the above-described embodiment, and by causing a computer (or CPU and/or MPU) in the system or apparatus to read and execute the program codes stored in the storage medium.

In such a case, the program codes read out of the storage medium serve in themselves to realize the novel functions of the present invention, and hence the storage medium storing the program codes constitutes the present invention. Storage mediums for use in supplying the program codes may be, e.g., floppy disks, hard disks, optical disks, magneto-optical disks, DVDS, CD-ROMS, magnetic tapes, nonvolatile memory cards, ROMS, and EEPROMS.

Also, it is needless to say that the functions of the above-described embodiment are realized by not only a computer reading and executing the program codes, but also an OS (Operating System) or the like which is working on the computer and executes part or whole of the actual processing to realize the functions of the above-described embodiment in accordance with instructions from the program codes. Further, as a matter of course, the present invention involves such a case in which the program codes read out of the storage medium are written into a memory provided in a function add-on board mounted in the computer or a function add-on unit connected to the computer, and a CPU or the like incorporated in the function add-on board or unit executes part or whole of the actual processing in accordance with instructions from the program codes, thereby realizing the function of the above-described embodiment.

As many apparently widely different embodiments of the present invention can be made without departing from the spirit and scope thereof, it is to be understood that the invention is not limited to the specific embodiments thereof except as defined in the appended claims.

According to the present invention, as described above, a printing data processing apparatus having a simpler automatic setting capability can be provided with the printer driver which can automatically set the printing mode and the printing conditions. Thus, when printing is made even with the initial settings of the printer driver remaining unchanged, an optimum printing result can be obtained. Also, those users, who are not contended with the printing conditions decided by the automatic selecting function, can set required ones of the printing conditions with no need of setting all of the printing conditions.

Stated otherwise, according to the present invention, when the printer driver having the function of automatically selecting the development mode is employed, the function of automatically selecting the development mode can be made more convenient to users.

Also, when the development mode is automatically selected in the printer driver having the function of automatically selecting the development mode, various items of print setting information designated in printing data can also be automatically selected.

To that end, in the printer driver capable of automatically selecting the development mode, not only an option for directly designating the development mode, but also an option for designating the function of automatically selecting the development mode are prepared in a user interface. Then, the option for designating the automatic selecting function is presented as an initial default. It is therefore possible to provide an environment allowing users to employ the automatic setting function more conveniently.

Further, there is provided a printer driver capable of analyzing the contents of printing to determine the type of overall information to be printed, automatically setting various items of pint setting information in accordance with an analyzed result, and selecting print settings optimum for the contents of printing.

Additionally, a user interface is provided which, even when the development mode is automatically selected in the printer driver capable of automatically selecting print setting information, does not accept the setting made by users on print setting items to be automatically decided in an automatic decision mode, but accepts the setting made by users on print setting items that are allowed for users to set. As a result, the automatic decision mode can be provided in fashion more convenient to users.

What is claimed is:

1. An information processing apparatus comprising:
   development mode selecting means allowing users to make selection to designate one of development modes including a vector mode in which printing data described in the printer control language to be developed into image data by a printing device is created, and an image mode in which printing data described in an image mode to be used in printing by said printing device is created, or to designate an automatic decision mode of automatically deciding which one of the development modes is used;
   print setting means for setting a plurality of print setting items in the printing data to be instructed to said printing device; and
   user interface providing means for providing a user interface which, when said automatic decision mode is selected, does not accept the setting made by users on those of said plurality of print setting items that should be automatically decided in said automatic decision mode, but accepts the setting made by users on those print setting items that are allowed for users to set.

2. An information processing method comprising the steps of:
   a development mode selecting step allowing users to make selection to designate one of development modes including a vector mode in which printing data described in the printer control language to be developed into image data by a printing device is created, and an image mode in which printing data described in an image mode to be used in printing by said printing device is created, or to designate an automatic decision mode of automatically deciding which one of the development modes is used;

a print setting step of setting a plurality of print setting items in the printing data to be instructed to said printing device; and a user interface providing step of providing a user interface which, when said automatic decision mode is selected, does not accept the setting made by users on those of said plurality of print setting items that should be automatically decided in said automatic decision mode, but accepts the setting made by users on those print setting items that are allowed for users to set.

3. A computer-readable memory medium which stores a print control program executed by an information processing apparatus, said program product comprising:

a development mode selection code for a development mode selection step of providing a user interface which includes an option for designating one of development modes including a vector mode in which printing data described in the printer control language to be developed into image data by a printing device is created, and an image mode in which printing data described in an image mode to be used in printing by said printing device is created, and an option for designating an automatic decision mode of automatically deciding which one of the development modes is used; and a print setting code for a print setting step of setting a plurality of print setting items in the printing data to be instructed to said printing device, wherein said development mode selection step provides a user interface which, when said automatic decision mode is selected, does not accept the setting made by users on those of said plurality of print setting items that should be automatically decided in said automatic decision mode, but accepts the setting made by users on those print setting items that are allowed for users to set.

4. An information processing apparatus according to claim 1, wherein, in said development mode selecting means, the option for designating the automatic decision mode is set to an initial default.

5. An information processing apparatus according to claim 1, further comprising:

printing data creating means for creating, in the development mode, printing data that includes print setting information designated by the print setting items containing at least one of printing resolution, printing gradation and shade.

6. An information processing apparatus according to claim 5, further comprising:

transmission processing means for controlling a process of transmitting the printing data created by said printing data creating means to said printing device via a network.

* * * * *

UNITED STATES PATENT AND TRADEMARK OFFICE
CERTIFICATE OF CORRECTION

PATENT NO. : 6,967,730 B2
APPLICATION NO. : 09/908698
DATED : November 22, 2005
INVENTOR(S) : Tomita It is certified that error appears in the above-identified patent and that said Letters Patent is hereby corrected as shown below:

DRAWINGS:
Sheet 6, FIG. 6, "MECHANISH" should read -- MECHANISM --; and
Sheet 14, FIG. 14, "CRRESPONDING" should read -- CORRESPONDING --.

COLUMN 2:
Line 3, "to," should be deleted; and
Line 16, "pint" should read -- print --.

COLUMN 6:
Line 61, "widow" should read -- window--.

COLUMN 10:
Line 29, "displays" should read -- display --.

COLUMN 13:
Lines 40 and 41, " 'low gradation" should read -- "low gradation" --, and
    " 'no gradation" should read -- "no gradation" --.

COLUMN 15:
Line 36, "DVDS, CD-ROMS," should read -- DVDs, CD-ROMs --; and
Line 37, "ROMS, and EEPROMS" should read -- ROMs, and EEPROMs --.

COLUMN 16:
Line 26, "pint" should read -- print --.

Signed and Sealed this

Fifteenth Day of August, 2006

JON W. DUDAS
*Director of the United States Patent and Trademark Office*